(12) United States Patent
Asano

(10) Patent No.: US 7,154,242 B2
(45) Date of Patent: Dec. 26, 2006

(54) MOVING MEMBER MECHANISM AND CONTROL METHOD THEREFOR

(75) Inventor: Tosiya Asano, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 10/430,333

(22) Filed: May 7, 2003

(65) Prior Publication Data

US 2004/0114116 A1  Jun. 17, 2004

(30) Foreign Application Priority Data

May 8, 2002 (JP) ........................................ 2002-132560
May 6, 2003 (JP) ........................................ 2003-128227

(51) Int. Cl.
 *G05B 11/01* (2006.01)

(52) U.S. Cl. .............................. 318/560; 310/12; 318/3; 318/9

(58) Field of Classification Search .............. 355/53.72; 310/12; 74/490.09; 356/500 XY; 318/135, 318/560, 3, 9, 14; 33/1 M
See application file for complete search history.

(56) References Cited

U.S. PATENT DOCUMENTS

| | | | |
|---|---|---|---|
| 3,015,768 A | 1/1962 | Hornfeck et al. ............. 318/28 |
| 4,270,073 A | 5/1981 | Harman ....................... 318/632 |
| 5,684,856 A | 11/1997 | Itoh et al. ..................... 378/34 |
| 5,917,580 A | 6/1999 | Ebinuma et al. ............... 355/53 |
| 6,227,817 B1 * | 5/2001 | Paden .......................... 417/356 |
| 6,442,858 B1 | 9/2002 | Asano .......................... 33/645 |
| 6,495,847 B1 | 12/2002 | Asano et al. ................ 250/548 |
| 2002/0008877 A1 | 1/2002 | Iwamoto et al. ............ 356/509 |

FOREIGN PATENT DOCUMENTS

EP  0 977 244 A2  2/2000
JP  P2000-106344 A  *  4/2000

OTHER PUBLICATIONS

Genesio, Roberto. "25: Controlli Automatici," *Manuale Cremonese di Meccanica Elettrotecnica Elettronica*, Parte Generale, vol. 1, 2$^{nd}$ Ed., 1999, Edizioni Cremonese, Florence, Italy.

European Search Report dated Dec. 4, 2003, issued in corresponding European patent appln. no. 03 25 2844, forwarded in a Communication dated Jan. 7, 2004.

* cited by examiner

*Primary Examiner*—Rina Duda
(74) *Attorney, Agent, or Firm*—Fitzpatrick, Cella, Harper & Scinto

(57) ABSTRACT

A moving member mechanism includes an electromagnet having a coil for driving a moving member, a first control mechanism which has an input portion which receives command information and an amplifier which supplies a current to the coil, and an offset compensation mechanism which includes a first integrator which time-integrates a signal at an input portion of the amplifier. The offset compensation mechanism is configured to negatively feed back an output from the first integrator to the input portion of the first control mechanism.

14 Claims, 9 Drawing Sheets

MOVING MEMBER MECHANISM AND CONTROL METHOD THEREFOR

FIELD OF THE INVENTION

The present invention relates to a moving member mechanism which positions a moving member, a control method therefor, and an exposure apparatus using the moving member mechanism.

BACKGROUND OF THE INVENTION

As an exposure apparatus used in a semiconductor manufacturing process, there have conventionally been known an apparatus called a stepper and an apparatus called a scanner. The stepper reduces a pattern image formed on a reticle and projects the pattern image onto a semiconductor wafer on a stage apparatus via a projection lens while moving step by step the wafer below the projection lens, thus sequentially exposing a plurality of portions on one wafer. The scanner relatively moves a wafer on a wafer stage and a reticle on a reticle stage with respect to a projection lens, emits slit-shaped exposure light during relative movement (scanning movement), and projects the reticle pattern onto the wafer. The stepper and scanner are considered to be the mainstream of exposure apparatuses in terms of the resolution and overlay accuracy.

One of the apparatus performance indices is the throughput, which represents the number of wafers processed per unit time. To realize a high throughput, high-speed movement is required for the wafer stage and reticle stage. A conventional reticle stage capable of high-speed driving with little heat generation is disclosed in Japanese Patent Laid-Open No 2000-106344.

In the conventional exposure apparatus, however, a current flowing through the driving coil of an electromagnet contains an offset current under the influence of a disturbance, even in the absence of any command information to the electromagnet. Even a small offset current causes a force error, failing to generate an accurate force.

SUMMARY OF THE INVENTION

The present invention has been made to overcome the conventional drawbacks, and has as its object to improve, e.g., the performance of a moving member mechanism.

According to the first aspect of the present invention, there is provided a moving member mechanism comprising: an electromagnet having a coil for driving a moving member; a first control mechanism which has an input portion and feedback-controls the electromagnet on the basis of command information input to the input portion, wherein the first control mechanism includes an amplifier which supplies a current to the coil; and an offset compensation mechanism which sets the current supplied from the amplifier to the coil to 0 when the command information represents 0.

According to a preferred aspect of the present invention, the offset compensation mechanism can comprise a first integrator which time-integrates, e.g., a signal at an input portion of the amplifier, and the offset compensation mechanism can be configured to negatively feed back an output from the first integrator to the input portion of the first control mechanism.

According to another preferred aspect of the present invention, the offset compensation mechanism can comprise a first hold switch which holds an output from the first integrator when, e.g., the command information represents 0, and supplies the held output from the first integrator to the input portion of the first control mechanism when the command information does not represent 0.

According to still another preferred aspect of the present invention, the moving member mechanism can further comprise a gap sensor which measures a gap between the electromagnet and the moving member, a gap correction unit which calculates a predetermined correction coefficient on the basis of the gap measured by the gap sensor, a current calculation unit which calculates a current supplied to the electromagnet on the basis of the command information, and a multiplier which multiplies by the correction coefficient the current calculated by the current calculation unit.

According to still another preferred aspect of the present invention, the moving member mechanism can further comprise a search coil which measures an induced voltage generated in the electromagnet, a second integrator which time-integrates the induced voltage measured by the search coil, and a second control mechanism which feedback-controls the electromagnet on the basis of a difference value between the command information and the induced voltage time-integrated by the second integrator.

According to still another preferred aspect of the present invention, the second control mechanism can comprise a drift compensation mechanism which detects a drift of the second integrator and supplies to the second control mechanism a compensation signal for canceling the drift.

According to still another preferred aspect of the present invention, the drift compensation mechanism can be configured to multiply an output from the second integrator by a gain and negatively feed back a product to an input portion of the second control mechanism.

According to still another preferred aspect of the present invention, the drift compensation mechanism can be configured to supply to the second integrator a signal which has substantially the same absolute value as an absolute value of a signal representing the drift and has an opposite sign.

According to still another preferred aspect of the present invention, the drift compensation mechanism can comprise a second hold switch which holds an output from the second integrator when the command information represents 0, and supplies the held output from the second integrator to the input portion of the second control mechanism when the induced voltage does not represent 0.

According to still another preferred aspect of the present invention, the drift compensation mechanism can be configured to negatively feed back an output from the first hold switch to an input portion of the second control mechanism.

According to the second aspect of the present invention, there is provided an exposure apparatus comprising an optical system which projects, to a substrate, exposure light incident on a mask bearing a pattern, and a stage apparatus which holds and aligns the substrate or the mask. The stage apparatus includes an electromagnet having a coil for driving a moving member, a first control mechanism which has an input portion and feedback-controls the electromagnet on the basis of command information input to the input portion, wherein the first control mechanism includes an amplifier which supplies a current to the coil, and an offset compensation mechanism which sets the current supplied from the amplifier to the coil to 0 when the command information represents 0.

According to the third aspect of the present invention, there is provided a method of controlling a moving member mechanism including an electromagnet having a coil for driving a moving member and an amplifier which supplies a current to the coil, comprising a control step of feedback-controlling the electromagnet on the basis of input command information, and an offset compensation step of setting a current supplied from the amplifier to the coil to 0 when the command information represents 0.

According to still another preferred aspect of the present invention, the offset compensation step preferably includes a step of time-integrating a signal at the input portion of the amplifier, and a step of negatively feeding back a time-integrated value to the command information input in the control step.

According to still another preferred aspect of the present invention, the offset compensation step preferably further includes a step of holding the time-integrated value when the command information represents 0, and a step of negatively feeding back the value held in the holding step to the command information input in the control step when the command information does not represent 0.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described below with reference to the accompanying drawings.

[First Embodiment]

Figure 1:
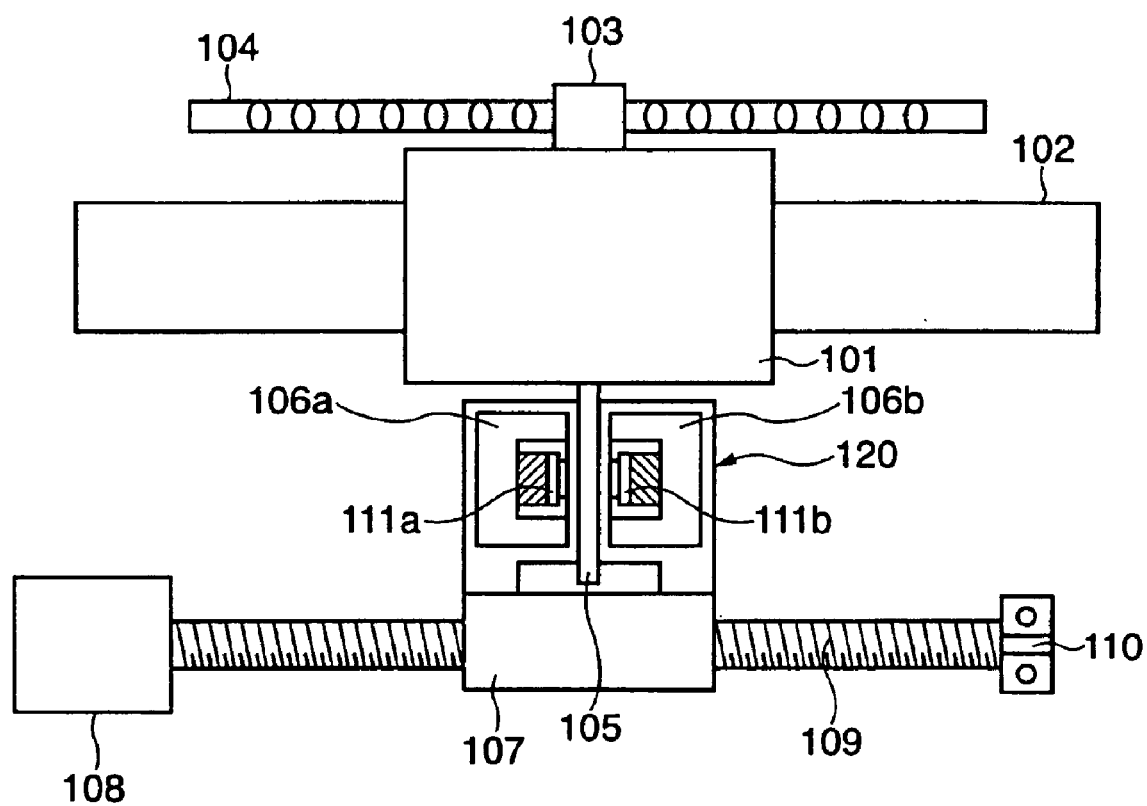
FIG. 1 is a view showing the arrangement of a stage apparatus according to the first preferred embodiment of the present invention.

FIG. 1 shows the arrangement of a stage apparatus using a moving member mechanism according to the first preferred embodiment of the present invention.

In the stage apparatus, a guide 102 is fixed onto a base (not shown). A stage 101 serving as a moving member which supports a workpiece is supported slidably along one axis with respect to the guide 102. A linear motor movable element 103 is fixed to one side surface of the stage 101. Integral structures of quadrupole magnets and yokes each for circulating the magnetic flux of the magnet are arranged on the upper and lower surfaces of the linear motor movable element 103. The linear motor movable element 103 face in a noncontact state a linear motor stator 104, which is fixed to the base (not shown). The linear motor stator 104 is constituted by fixing the array or a plurality of coils to a stator frame.

The linear motor is a general brushless DC motor of an expanded type. The linear motor switches a driving coil and its current direction in accordance with the relative positional relationship between the magnet and the coil, generating a desired force in a desired direction. The stage 101 supports a cube corner reflector for a laser interferometer (not shown). The laser interferometer (not shown) measures the displacement of the stage 101 in the moving direction. The stage 101 is positioned by a stage control system (not shown) on the basis of a command from a movement command unit (not shown) and the displacement measurement value of the stage 101. A magnetic plate 105 is arranged on the other side surface of the stage 101. A pair of electromagnetic units including electromagnetic main bodies 106a and 106b are so arranged as to sandwich the magnetic plate 105 from the two sides.

The pair of electromagnetic units are fixed to a nut 107 on an electromagnet transfer member 120. The nut 107 can move in almost the same direction as that of the stage 101 by a motor 108 and feed screw 109. As a result, the pair of electromagnetic units can move in almost the same direction as that of the stage 101 by the motor 108 and feed screw 109. One end of the feed screw 109 is supported by a bearing 110. The motor 108, feed screw 109, and bearing 110 are also fixed onto the base (not shown). The electromagnet main bodies 106a and 106b which constituted the pair of electromagnetic units, and the magnetic plate 105 are kept in a noncontact stage via a small gap. Each of the electromagnet main bodies 106a and 106b is comprised of an E-shaped yoke and a driving coil arranged on a central tooth. By causing a current to flow through the driving coil, the attraction force acts between the yoke and the magnetic plate 105. The driving coils of the electromagnet main bodies 106a and 106b can seperately control the voltage or current. By adjusting a voltage or current supplied to the two coils, the attraction force, which acts between the electromagnets and the magnetic plate 105, can be adjusted. Further, the resultant force, which acts on the magnetic plate 105 from the pair of electromagnet main bodies 106a and 106b, and the direction of the resultant force, can be adjusted.

The displacement of the electromagnet transfer member 120 in the moving direction is measured by a position sensor (not shown). The electromagnet transfer member 120 is positioned by an electromagnet transfer member control system (not shown). The electromagnet transfer member control system properly feeds forward the acceleration/deceleration force of the electromagnet transfer member 102, suppressing the positioning deviation of the electromagnet transfer member 102 to be small in acceleration/deceleration. When the stage 101 is to be moved, it is desirable to perform positioning control using a feedback system for the stage 101, positioning control using feedforward and feedback systems for the electromagnet transfer member 102, and positioning control using the feedforward system for transferring an acceleration/deceleration force to the stage 101 for the electromagnet main bodies 106a and 106b. The linear motor of the stage 101 need not generate the acceleration/deceleration force of the stage 101, and suffices to feed back a force necessary for fine positioning. This can suppress heat generation to be very small.

Figure 4:
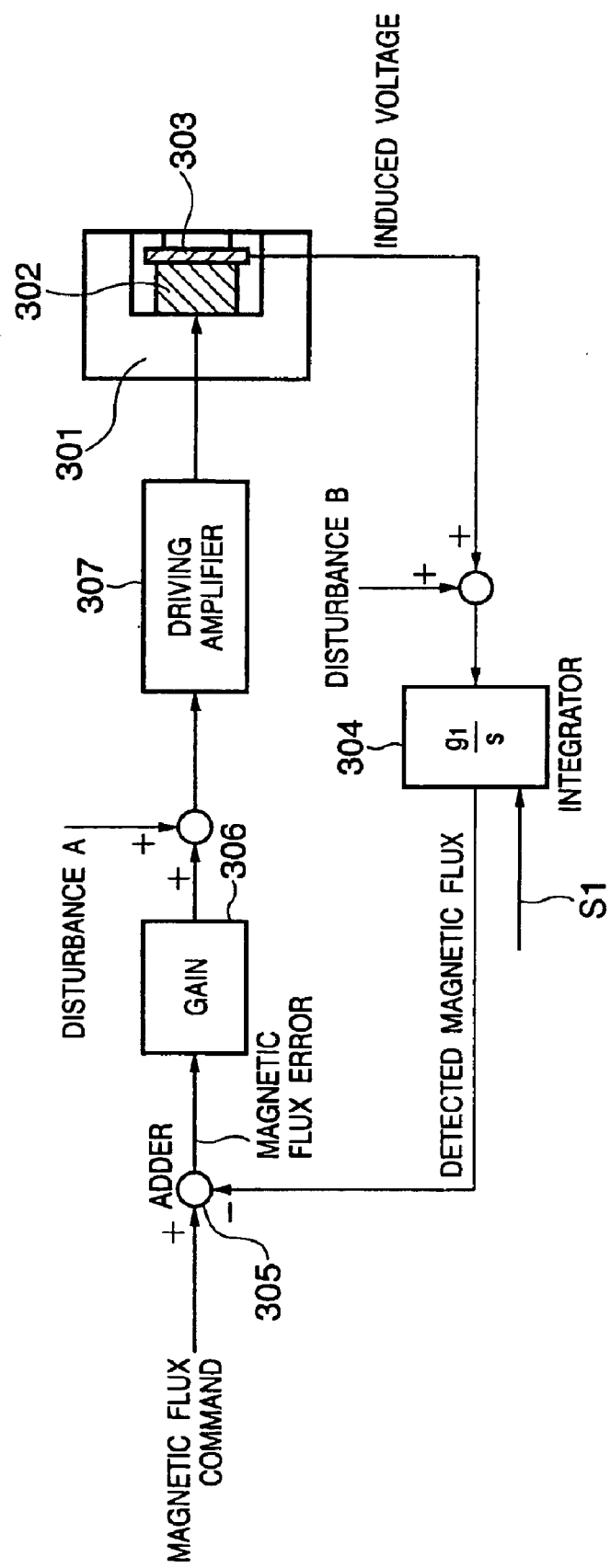
FIG. 4 is a view showing the basic arrangement of a control system out of the electromagnet control system shown in FIG. 3, and disturbance applied to the control system.

FIG. 4 is a diagram showing an electromagnet control system for either of the pair of electromagnetic units in FIG. 1. A force generated by the electromagnet has a value proportional to the square of the magnetic flux between the electromagnet and the magnetic late. The electromagnet control system receives, from a main controller (not shown), which controls the overall sequence of the stage, command information (to be referred to as a "magnetic flux command" hereinafter), having the dimension of a magnetic flux, which is the dimensions of the square root of the absolute value of an acceleration/deceleration force. An electromagnet yoke 301 has a driving coil 302 and a search coil 303, and an induced voltage is measured as output information from the electromagnet. The induced voltage is time-integrated into a magnetic flux dimension (to be referred to as a "detected magnetic flux" hereinafter) by an integrator ($g_1$ is the gain) 304. The magnitude of the magnetic flux used to generate a desired force an be calculated from the number of turns of the search coil 303, the sectional area of the electromagnet yoke 301 at a portion where the search coil 303 is arranged, and the gain $g_1$ of the integrator 304. The calculated value is input as a magnetic flux command.

The electromagnet control system has an adder 305 as an input unit. The adder 305 calculates a magnetic flux error as the difference between an input magnetic flux command and a detected magnetic flux. The magnetic flux error is multiplied by a proper gain by a gain unit 306, and the resultant signal is sent to a driving amplifier 307. The voltage/current of the driving coil 302 is controlled by the driving amplifier 307, and a desired magnetic flux is generated in the electromagnet. In other words, a desired attraction force is generated in the electromagnet. Note that the electromagnet control system comprises an input system for an integrator reset signal S1 for resetting a detected magnetic flux to 0 in activation of the apparatus. When the integrator reset signal S1 is input to the integrator 304, the output from the integrator 304 is reset to 0.

The electromagnet control system receives the following disturbances. Disturbance A gives an offset to the current of the driving coil 302. Disturbance A is express as an equivalent disturbance, which is a total of disturbances at respective portions. Disturbance contains the offset of a magnetic flux command value, the offsets of a substracter and the gain unit 306, and the offset of the driving amplifier 307. Disturbance B equivalently expresses a disturbance, which generates a drift in the integrator 304. In an ideal state, when the magnetic flux command represents 0, the current flowing through the driving coil 302 is 0, the detected magnetic flux is 0, and the magnetic flux error is 0. This ideal state is lost by disturbances A an B. For example, let E be the current which flows through the driving coil 302 when a desired force is generated in the electromagnet (magnetic flux command does not represent 0), and e be the offset current, which flows due to the disturbances when the magnetic flux command represents 0. The initial offset current is kept held even in control. The attraction force is proportional to the square of the current, and the force error is proportional to $$(E+e)^2-E^2=2Ee+e^2 \quad (1)$$

If the dimension of $e^2$ is ignored, the force error is 0 when the magnetic flux command represents 0. However, the error in generation of the maximum force is influenced by the term 2Ee. Hence, even a small offset current influences the force error.

Figure 2:
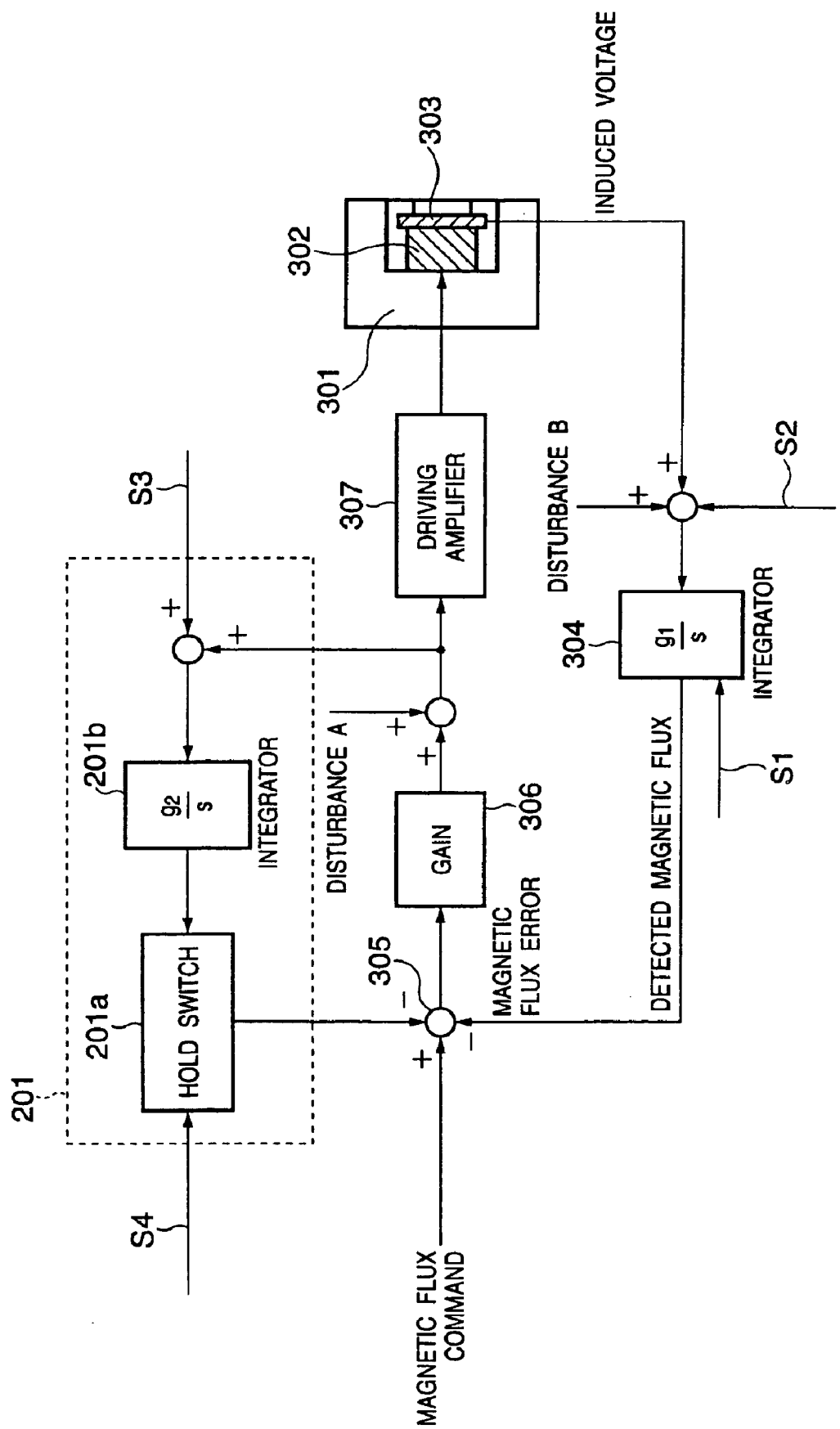
FIG. 2 is a diagram showing the arrangement of the electromagnet control system of the stage apparatus in FIG. 1.

In FIG. 2, the influence of equivalent disturbances A and B can be eliminated. An input terminal for a drift correction signal S2 is arranged at the input port of the integrator 304, which time-integrates an induced voltage from the search coil 303. The drift correction signal S2 is calculated, as follows, in advance by the main controller. The stage is kept still, and driving coil 302 of the electromagnet is short-circuited. This inhibits any change in magnetic flux, and the signal from the search coil 303 becomes 0. After the integrator 304 is temporarily reset, the integrator 304 is operated for a given time to observe the output. As the drift characteristic of the integrator 304 in the first embodiment, equivalent disturbance B can be calculated from the integration operation time and integrator output variation amount. The drift correction signal S2 has, e.g., a value with the same absolute value as that of a signal representing disturbance B, but an opposite sign, so as to cancel disturbance B. A conceivable variation factor of equivalent disturbance B is variations in the thermal characteristic of an electrical element. The variation speed is considered to be slow. The drift of the integrator 304 can be substantially suppressed within a finite time. Drift correction permits a small error, which will be described later. This function can be omitted, as long as the drift of the integrator 304 occurs at a negligible degree.

A dotted part in FIG. 2 is an offset compensation system 201 for coping with offset disturbance A. When the magnetic flux command represents 0, the value at the input terminal of the driving amplifier 307 is integrated by an integrator 201b (gain $g_2$), and the integrated value is negatively fed back to the adder 305. With loop operation, the value at the input terminal of the driving amplifier 307 is always 0 when the magnetic flux command represents 0. Note that the driving amplifier 307 may have an offset. That is, even if a "0" command is input to the driving amplifier 307, the current flows through the driving coil 302, and a given value must be input to the input terminal of the driving coil 302 in order to completely eliminate the current from the driving coil 302. This value is obtained by checking the characteristic of the driving coil 302 in advance. The value is sent as driving amplifier offset adjustment S3 from the main controller to the offset compensation system 201. When, therefore, the magnetic flux command represents 0, the current flowing through the driving coil 302 can be reliably eliminated. This loop can also cancel the integrator drift correction error described above. That is, the loop is a system which permits input of an offset to the adder 305 upon the drift of the integrator.

A signal representing whether the magnetic flux command represents 0 is sent as a driving timing command S4. If the magnetic flux command does not represent 0, the driving timing command S4 operates a hold switch 201a, the loop surrounded by the dotted line is substantially disconnected, and an immediately preceding value is held and sent to the adder 305. When the magnetic flux command represents 0 at the end of driving, the driving timing command S4 operates the hold switch 201a again, the loop of the offset compensation system (within the dotted line) 201 is established, and the current of the driving coil 302 becomes 0. In this manner, the influence by the drift of the integrator 304 can be eliminated to remove the offset current of the driving coil 302. A magnetic flux corresponding to a magnetic flux command can be generated, and thus a desired force can be generated. According to this method, a small drift cannot be eliminated and remains. Long-term stage driving may cause an overflow over the operation range of the output of the integrator 304 owing to the drift. To prevent this, the integrator 304 is reset in accordance with a command from the main controller while the stage is not moved.

[Second Embodiment]

Figure 7:
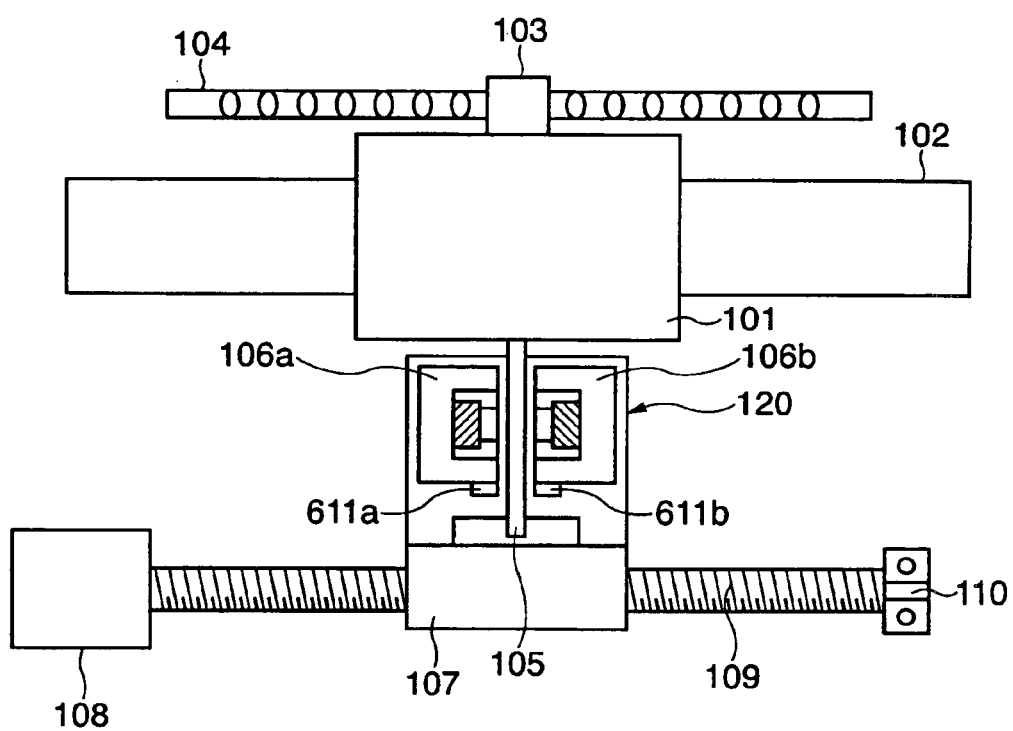
FIG. 7 is a view showing the arrangement of a reticle stage.

The arrangement of a stage apparatus using a moving member mechanism according to the second embodiment of the present invention will be described. FIG. 7 is a conceptual view showing the schematic arrangement of the stage apparatus according to the second embodiment of the present invention. The stage apparatus is schematically constituted by changing some of the functions of the stage apparatus according to the first embodiment. More specifically, the stage apparatus according to the second embodiment of the present invention comprises a gap sensor 611 (gap sensor 611a and 611b), which measures the gap between an electromagnet main body 106 (electromagnet main body 106a or 106b) and a magnetic plate 105, instead of the search coil 303 of the stage apparatus according to the first embodiment.

Figure 8:
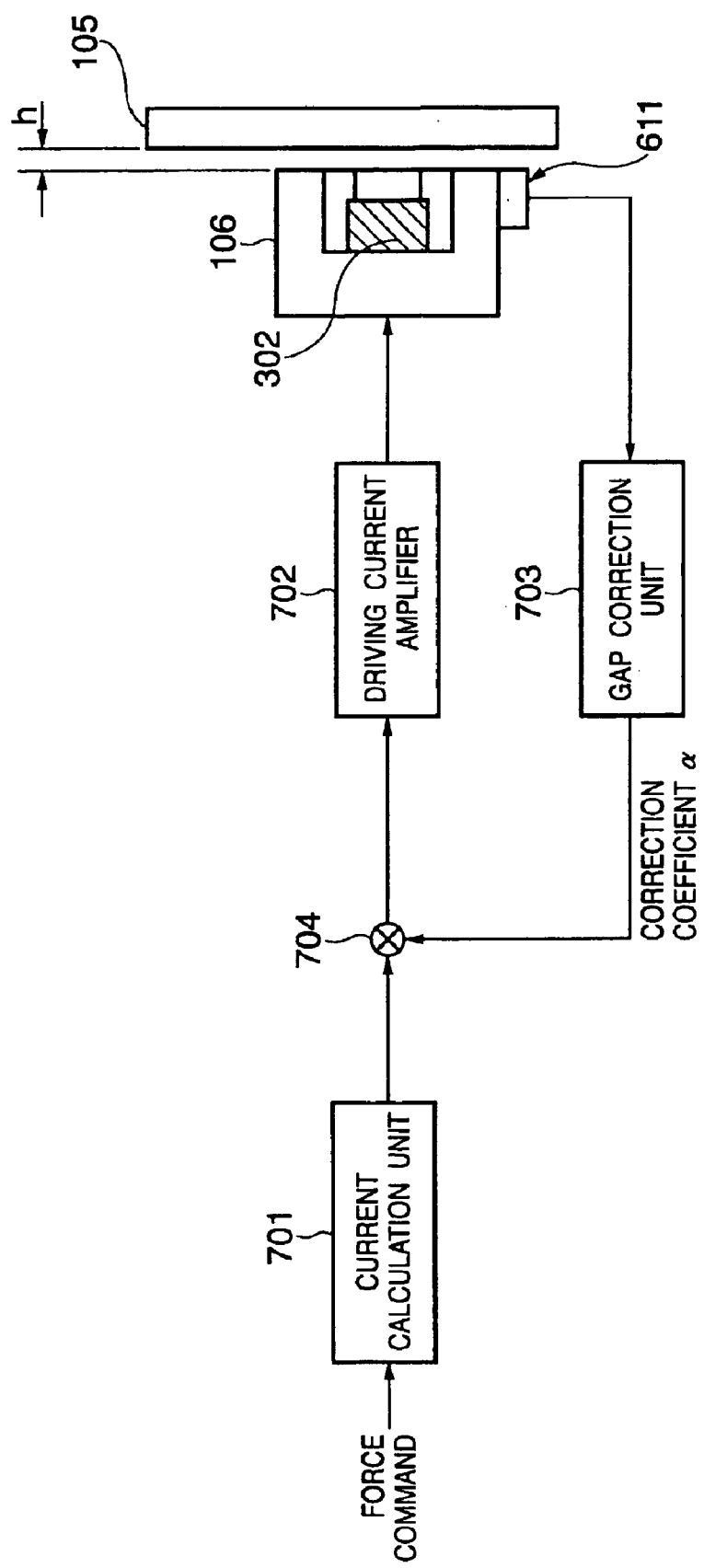
FIG. 8 is a view showing the control system of one electromagnet main body in FIG. 7.

FIG. 8 is a view showing an electromagnet control system for either of a pair of electromagnetic units in FIG. 7. The electromagnet control system receives predetermined command information (force command) on the basis of the acceleration/deceleration of a stage 101 in FIG. 7. The attraction force generated by the electromagnet is proportional to the square of the current flowing through a driving coil 302. A current calculation unit 701 in the electromagnet control system calculates a current value to be supplied to the driving coil 302 of the electromagnet main body 106 on the basis of command information (force command). A driving current amplifier 702 drives the driving coil 302 on the basis of the current value (current command) calculated by the current calculation unit 701. Letting h be the gap between the electromagnet main body 106 and the magnetic plate 105, the attraction force generated in the electromagnet is proportional to about $1/h^2$. The proportional factor is desirably measured in advance. The gap sensor 611 is arranged near the electromagnet main body 106. The gap sensor 611 measures the gap between the electromagnet main body 106 and the magnetic plate 105 as information output from the electromagnet. A gap correction unit 703 calculates a correction coefficient α. A multiplier 704 in the electromagnet control system multiplies by the correction coefficient α a current value (current command) calculated by the current calculation unit 701. This arrangement can suppress variations in attraction force upon gap variations.

Figure 3:
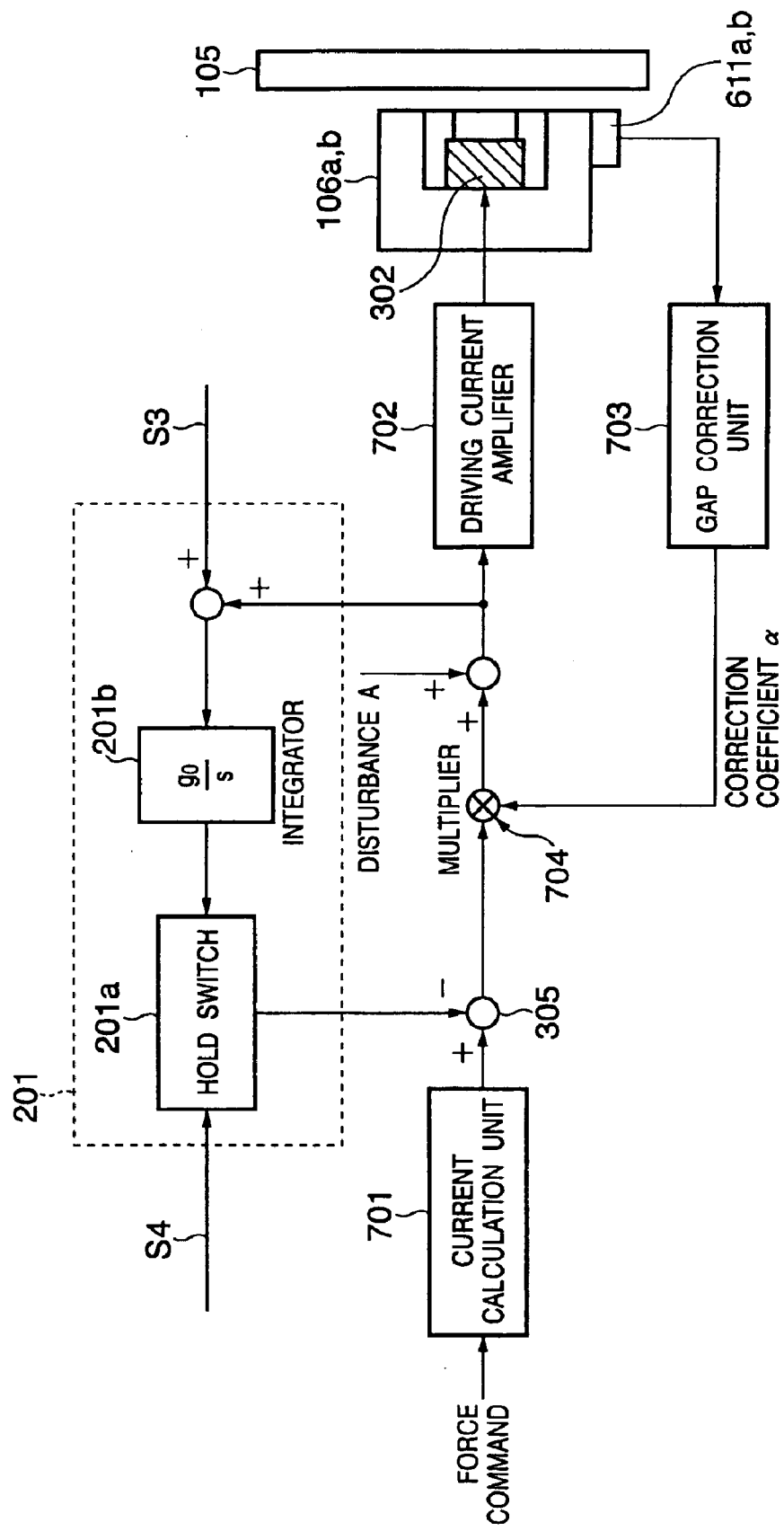
FIG. 3 is a diagram showing the arrangement of the electromagnet control system of a stage apparatus according to the second preferred embodiment of the present invention.

FIG. 3 is a diagram showing the electromagnet control system according to the second embodiment of the present invention. The electromagnet control system is schematically constituted by changing some of the functions of the electromagnet control system in FIG. 2 according to the first embodiment. More specifically, the gap sensor 611 and gap correction unit 703 replace the search coil 303 and integrator 304 of the electromagnet control system according to the first embodiment. Further, the multiplier 704 replaces the gain 306 of the electromagnet control system according to the first embodiment. The multiplier 704 multiplies an output from the adder 305 by the correction coefficient α calculated by the gap correction unit 703.

Similar to FIG. 2, disturbance A equivalently represents a disturbance which gives the offset current of the driving coil 302 that is generated in the current calculation unit 701, driving current amplifier 702, or the like. A dotted part in FIG. 3 is an offset compensation system 201 for coping with disturbance A. When the force command represents 0, the value at the input terminal of the driving current amplifier 702 is integrated by an integrator 201b (gain $g_0$), and the integrated value is negatively fed back to an adder 305. With loop operation of the offset compensation system 201, the value at the input terminal of the driving current amplifier 702 is always 0 when the force command represents 0. When the force command represents 0, e.g., "0" is sent as a driving timing command S4 to a hold switch 201a, and an output from the integrator 201b is sent to the adder 305. When the force command does not represent 0, e.g., "1" is sent as the driving timing command S4 to the hold switch 201a, the loop surrounded by the dotted line is substantially disconnected, and an output from the integrator 201b that has been held by the hold switch 201a immediately before the loop is disconnected is sent to the adder 305. Note that the offset value of the driving current amplifier 702 can be eliminated by checking the characteristic of the driving current amplifier 702 in advance and sending the signal of driving amplifier offset adjustment S3 from the main controller to the offset compensation system 201, as shown in FIG. 3. When, therefore, the force command represents 0, the current flowing through the driving coil can be reliably eliminated. The signal of driving amplifier offset adjustment S3 can take the same absolute value as that of, e.g., a signal representing the characteristic of the driving amplifier 702 but an opposite sign.

[Third Embodiment]

Figure 5:
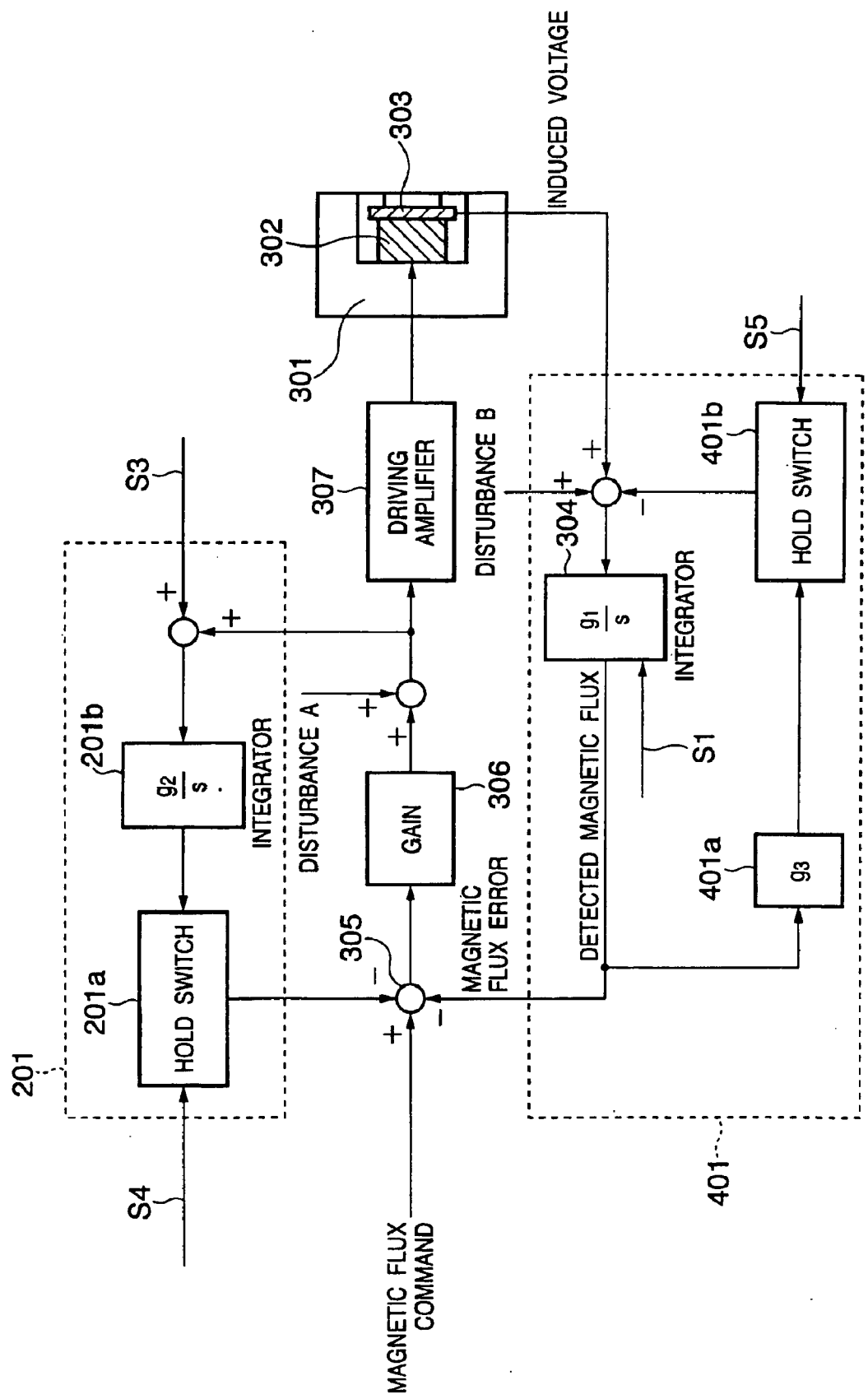
FIG. 5 is a diagram showing the arrangement of the electromagnet control system of a stage apparatus according to the third preferred embodiment of the present invention.

FIG. 5 shows the arrangement of an electromagnet control system according to the third embodiment. A basic magnetic flux feedback system and offset compensation system 201 are the same as those in FIG. 2. If the magnetic flux command represents 0 in a drift compensation system 401 of FIG. 5, a detected magnetic flux as an output from an integrator 304 is multiplied by a gain ($g_3$) 401a, and the product is negatively fed back to the input terminal of the integrator 304. A transfer function t(s) of a closed loop including the integrator 304 and gain element 401a exhibits a first-order lag:

$$t(s) = \frac{g_1}{s + g_1 g_3}. \qquad (2)$$

A response in a steady state upon application of disturbance B with very-slow variations to this system takes an almost constant value, suppressing the drift. The time constant of the transfer function t(s) suffices to be faster than variations in disturbance B, and does not require a very small value. For the time constant, $g_3$ is set to a gain which provides a time constant of about 1 sec. The integrator 304 can steadily output a given value, and this value is eliminated by the operation of the offset compensation system 201, similar to the control system in FIG. 2.

If the magnetic flux command does not represent 0, a driving timing command S5 is supplied to a hold switch 401b, the loop of the drift compensation system 401 is substantially disconnected, and the feedback term to the input terminal of the integrator 304 is held at an immediately preceding value. This operation suppresses the drift of the integrator 304 during acceleration/deceleration, and the integrator 304 operates as only an integrator. Note that the driving timing command S5 can use the same command signal as that of the driving timing command S4.

When the magnetic flux command becomes 0 again at the end of driving, the driving timing command S5 is supplied to the hold switch 401b, and the loop of the drift compensation system 401 is closed again. Even if disturbance B varies, the drift is automatically suppressed when the magnetic flux command represents 0. Even if the stage is driven for a long time, all or some of the drift components are accumulated to prevent overflow of the integrator 304. Compared to the control system of FIG. 2 described in the first embodiment, the drift is corrected by only closing the loop of the drift compensation system 401. Operation of obtaining a drift correction value in advance can be omitted. In the use of the drift compensation system, the offset of an output from the integrator 304 is accepted, and the offset compensation system 201 shown in FIG. 2 must be adopted.

[Fourth Embodiment]

Figure 6:
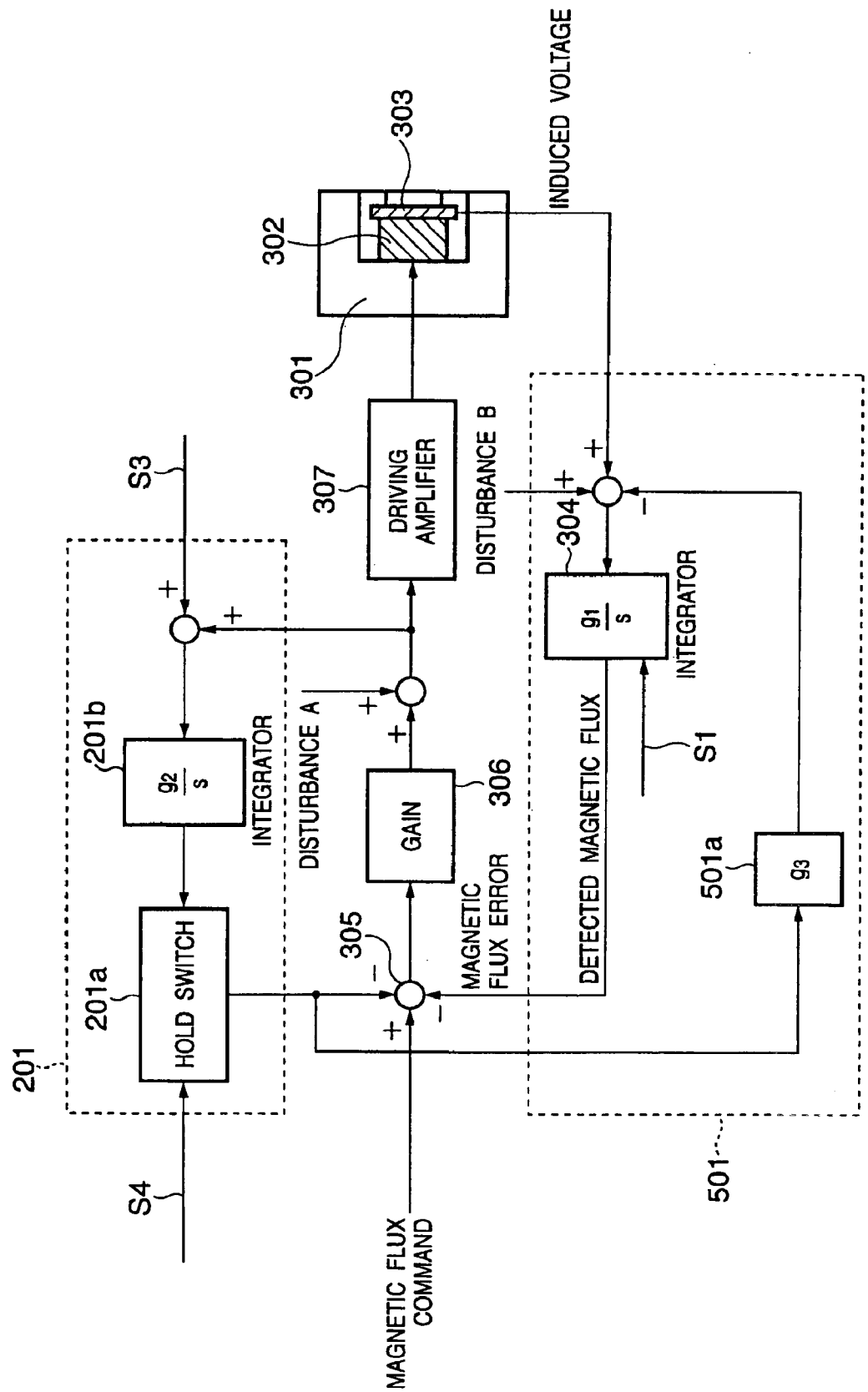
FIG. 6 is a diagram showing the arrangement of the electromagnet control system of a stage apparatus according to the fourth preferred embodiment of the present invention.

FIG. 6 shows the arrangement of an electromagnet control system according to the fourth embodiment. FIG. 6 shows a modification to the arrangement of FIG. 5 described in the third embodiment. To correct the drift, a signal containing a drift component is used. The signal of an offset compensation system 201 contains a drift component. Offset disturbance A varies very slowly, similar to drift disturbance B. Thus, most of the dynamic component of the offset correction signal is a drift component. The drift and offset can be corrected using an arrangement in which an output from a hold switch 201a in the offset compensation system 201 of FIG. 6 (signal obtained by integrating a signal at the input of a driving amplifier 307 by an integrator 201b) is multiplied by a gain ($g_3$) 501a of a drift compensation system 501 and the product is negatively fed back to the input terminal of an integrator 304. An attraction force corresponding to a magnetic flux command can be generated by the electromagnet. Note that the gain ($g_3$) 501a can use the same building component as that of the gain ($g_3$) 401a in the third embodiment.

The advantage of the arrangement according to the fourth embodiment is that no detected magnetic flux need be supplied to the drift compensation system 501. For example, in assembling a control system by using a digital computer, the number of operations of supplying a detected magnetic flux to the digital system can be decreased. The arrangement of FIG. 5 and that of FIG. 6 exhibit the same performance, but are different in an output from the integrator 304 and the equilibrium value of the offset correction value when the magnetic flux command represents 0.

As described above, the electromagnet control system according to the first to fourth embodiments detects a magnet flux, which is physically correlated with the attraction force generated by the electromagnet, feeds back the detected magnetic flux, and thus, can control the attraction force at high precision. The drift of the integrator in the magnetic flux detection system and the offset current of the driving coil in non-driving are eliminated. The control system is, therefore, resistant to disturbance of the electrical system. In the use of electromagnetic coupling for transfer of an acceleration/deceleration force, the arrangement of the electromagnetic coupling control system can be provided.

The movable portion of the stage apparatus according to the first to fourth embodiments can be adopted as a stage structure which supports a wafer in the wafer stage system of a semiconductor exposure apparatus and/or a reticle in the reticle stage system.

The moving member mechanism according to the preferred embodiments of the present invention can cause the electromagnet to generate an accurate force. The moving member mechanism according to the preferred embodiments of the present invention can provide a moving member mechanism such as a high-precision stage with little heat generation. The electromagnet control system for controlling the moving member mechanism according to the preferred embodiments of the present invention can provide a high-precision control system for transfer of a driving command for an acceleration/deceleration force, or the like, and a control system resistant to disturbance.

[Other Embodiment]

Figure 9:
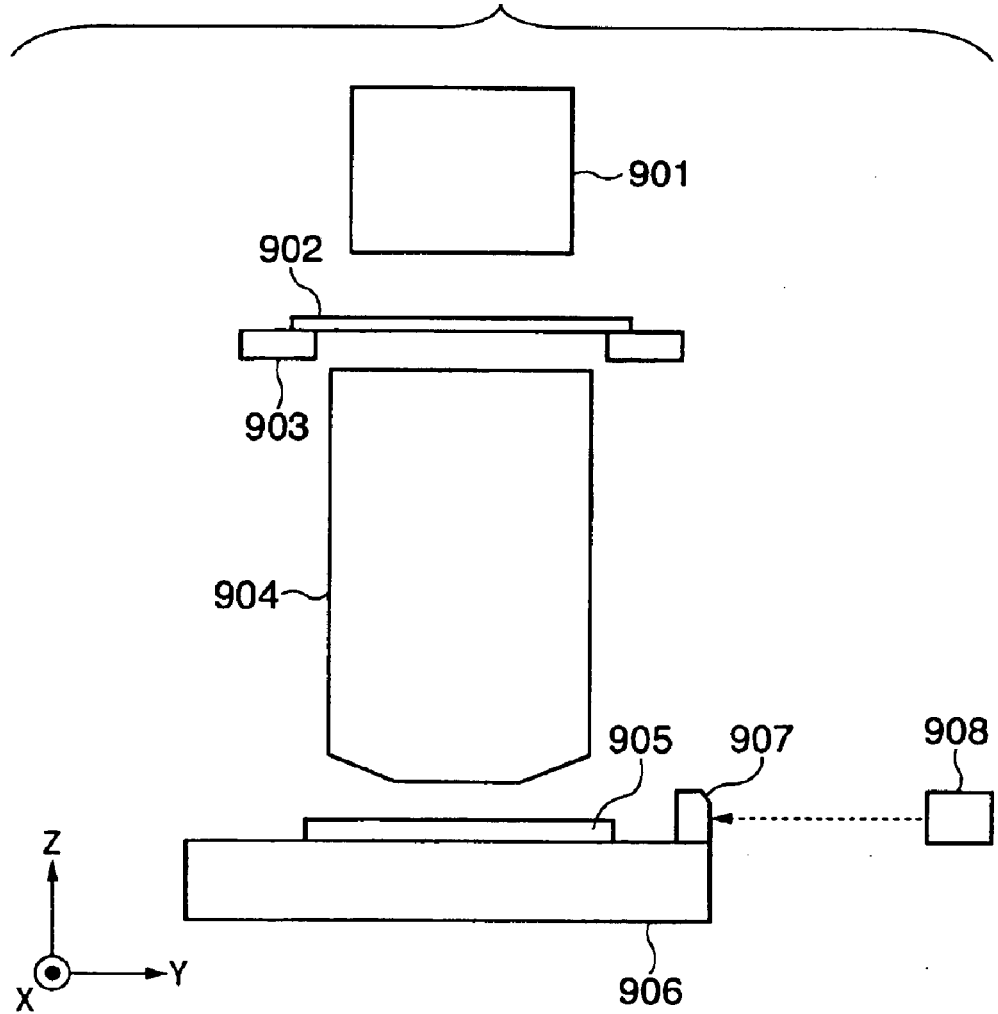
FIG. 9 is a schematic view showing the arrangement of an exposure apparatus.

FIG. 9 is a schematic view showing an arrangement when the moving member mechanism according to the preferred embodiments of the present invention is applied to an exposure apparatus used in a semiconductor manufacturing process. In FIG. 9, light emitted from an illumination optical system 901 irradiates a reticle 902 serving as a mask. The reticle 902 is held by a reticle stage 903, and the pattern of the reticle 902 is reduced and projected at the demagnification of a reduction projection lens 904. The image plane of the reduction projection lens 904 on which the reticle pattern image is formed is perpendicular to the Z direction. The surface of a substrate 905 serving as a sample to be exposed is coated with a resist, and has an array of shots formed in the exposure step. The substrate 905 to be controlled is set on a stage 101 serving as a moving member. The stage 101 has a chuck which holds the substrate 905, and an X-Y stage serving as a driving unit which can move horizontally along the X- and Y-axes. Position information of the stage 101 is measured by a laser interferometer 908 with respect to a mirror 907 fixed to the stage 101. The moving member mechanism according to the preferred embodiments of the present invention can drive the stage 101 at high precision.

As many apparently widely different embodiments of the present invention can be made without departing from the spirit and scope thereof, it is to be understood that the invention is not limited to the specific embodiments thereof except as defined in the claims.

What is claimed is:

1. An exposure apparatus comprising:
   an optical system which projects exposure light incident on a mask bearing a pattern onto a substrate; and
   a stage apparatus which holds and aligns the substrate or the mask,
   the stage apparatus including:
   (i) an electromagnet having a coil for driving the substrate or the mask;
   (ii) a first control system which has an input portion which receives command information and an amplifier which supplies a current to the coil; and
   (iii) an offset compensation system comprising a first integrator which time-integrates a signal at an input portion of the amplifier,
   wherein the offset compensation system is configured to negatively feed back an output from the first integrator to the input portion of the first control system.

2. The exposure apparatus according to claim 1, wherein said offset compensation system is configured to reduce an offset current supplied to the coil when the command information represents zero.

3. The exposure apparatus according to claim 2, wherein said offset compensation system reduces the offset current supplied to the coil on the basis of a predetermined offset of the amplifier.

4. A moving member mechanism comprising:
   an electromagnet having a coil for driving a moving member;
   a first control system which has an input portion which receives command information and an amplifier which supplies a current to the coil; and
   an offset compensation system which comprises a first integrator which time integrates a signal at an input portion of the amplifier, wherein the offset compensation system is configured to negatively feed back an output from the first integrator to the input portion of the first control system, and wherein the offset compensation system is controlled such that the current supplied from the amplifier to the coil is set to zero when the command information represents zero.

5. A moving member mechanism comprising:

an electromagnet having a coil for driving a moving member;

a first control system which has an input portion which recieves command information and an amplifier which supplies a current to the coil; and an offset compensation system which comprises a first integrator which time integrates a signal at an input portion of the amplifier, wherein the offset compensation system is configured to negatively feed back an output from the first integrator to the input portion of the first control system, and wherein the offset compensation system comprises a first hold switch which performs the negative feed back when the command information represents zero, and sends a preceding value to the input portion when the command information does not represents zero.

6. A moving member mechanism comprising:

an electromagnet having a coil for driving a moving member;

a first control system which has an input portion which recieves command information and an amplifier which supplies a current to the coil;

an offset compensation system which comprises a first integrator which time integrates a signal at an input portion of the amplifier;

a gap sensor which measures a gap between the electromagnet and the moving member;

a gap correction unit which calculates a predetermined correction coefficient on the basis of the gap measured by the gap sensor;

a current calculation unit which calculates a current supplied to the electromagnet on the basis of the command information; and a multiplier which multiplies by the correction coefficient the current calculated by the current calculation unit, wherein the offset compensation system is configured to negativeley feed back an output from the first integrator to the input portion of the first control system.

7. A moving member mechanism comprising:

an electromagnet having a coil for driving a moving member;

a first control system which has an input portion which recieves command information and an amplifier which supplies a current to the coil;

an offset compensation system which comprises a first integrator which time integrates a signal at an input portion of the amplifier;

a search coil which measures an induced voltage generated in the electromagnet;

a second integrator which time integrates the induced voltage measured by the search coil; and a second control system which feedback controls the electromagnet on the basis of a difference value between the command information and the induced voltage time integrated by the second integrator, wherein the offset compensation system is configured to negatively feed back an output from the first integrator to the input portion of the first control system.

8. The apparatus according to claim 7, wherein the second control system comprises a drift compensation system which detects a drift of the second integrator and supplies to the second control system a compensation signal for canceling the drift.

9. The apparatus according to claim 8, wherein the drift compensation system is configured to multiply an output from the second integrator by a gain and negatively feed back a product to an input portion of the second control system.

10. The apparatus according to claim 8, wherein the drift compensation system is configured to supply to the second integrator a signal which has substantially the same absolute value as an absolute value of a signal representing the drift and has an opposite sign.

11. The apparatus according to claim 8, wherein the drift compensation system comprises a second hold switch which holds an output from the second integrator when the command information represents zero, and supplies the held output from the second integrator to the input portion of the second control mechanism when the induced voltage does not represent zero.

12. The apparatus according to claim 8, wherein the drift compensation system is configured to negatively feed back an output from the first hold switch to an input portion of the second control system.

13. A method of controlling a moving member mechanism including an electromagnet having a coil for driving a moving member and an amplifier which supplies a current to the coil, said method comprising:

a control step of controlling the electromagnet on the basis of input command information; and an offset compensation step of time integrating a signal at the input portion of the amplifier, and negatively feeding back a time integrated value to the command information input in the control step, wherein the offset compensation step includes a step of setting the current supplied from the amplifier to the coil zero when the command information represents zero.

14. A method of controlling a moving member mechanism including an electromagnet having coil for driving a moving member and an amplifier which supplies a current to the coil, said methog comprising:

a control step of controlling the electromagnet on the basis of input command information; and an offset compensation step of time integrating a signal at the input portion of the amplifier, negatively feding back a time integrated value to the command information input in the control step, wherein the offset compensation step further includes a step of performing the negative feed back when the command information represents zero, and sending a preceding value to the command information input in the control step when the command information does not represent zero.

* * * * *

UNITED STATES PATENT AND TRADEMARK OFFICE
CERTIFICATE OF CORRECTION

PATENT NO. : 7,154,242 B2
APPLICATION NO. : 10/430333
DATED : December 26, 2006
INVENTOR(S) : Tosiya Asano It is certified that error appears in the above-identified patent and that said Letters Patent is hereby corrected as shown below:

COLUMN 5:
Line 49, "substractor" should read -- subtractor --.

COLUMN 11:
Line 25, "represents" should read -- represent --.

COLUMN 12:
Line 6, "The apparatus" should read -- The mechanism --.
Line 11, "The apparatus" should read -- The mechanism --.
Line 16, "The apparatus" should read -- The mechanism --.
Line 21, "The apparatus" should read -- The mechanism --.
Line 28, "The apparatus" should read -- The mechanism --.
Line 54, "feding" should read -- feeding --.

Signed and Sealed this

Eleventh Day of September, 2007

JON W. DUDAS
*Director of the United States Patent and Trademark Office*